Feb. 6, 1962 R. P. HUMPHREY 3,019,772
FLUID MOTOR WITH FLEXIBLE TUBULAR CYLINDERS
SYMMETRICALLY SPACED ABOUT THE POWER SHAFT
Original Filed April 27, 1959 2 Sheets-Sheet 2
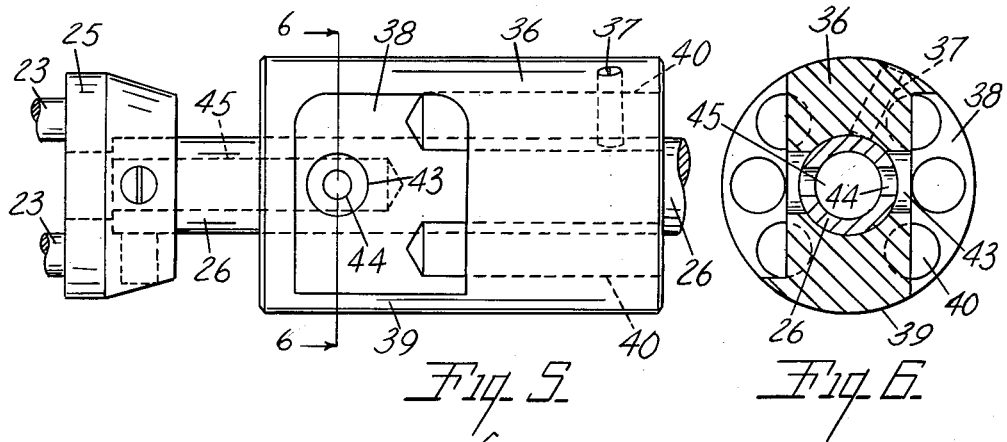
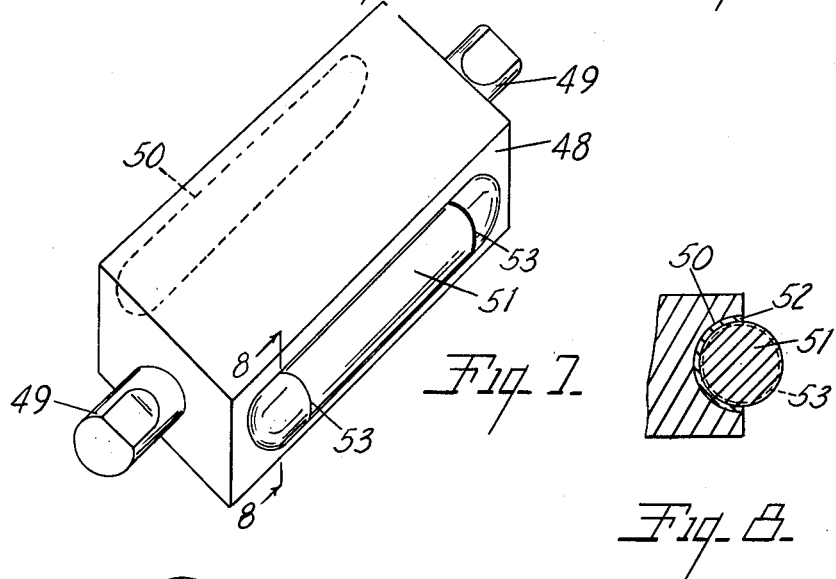
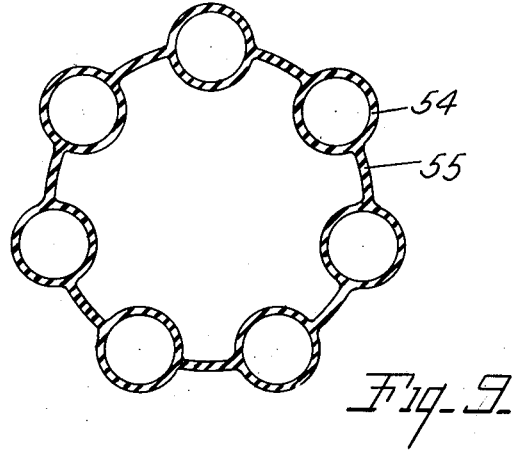
INVENTOR.
Robert P. Humphrey
BY
ATTORNEY United States Patent Office 3,019,772
Patented Feb. 6, 1962

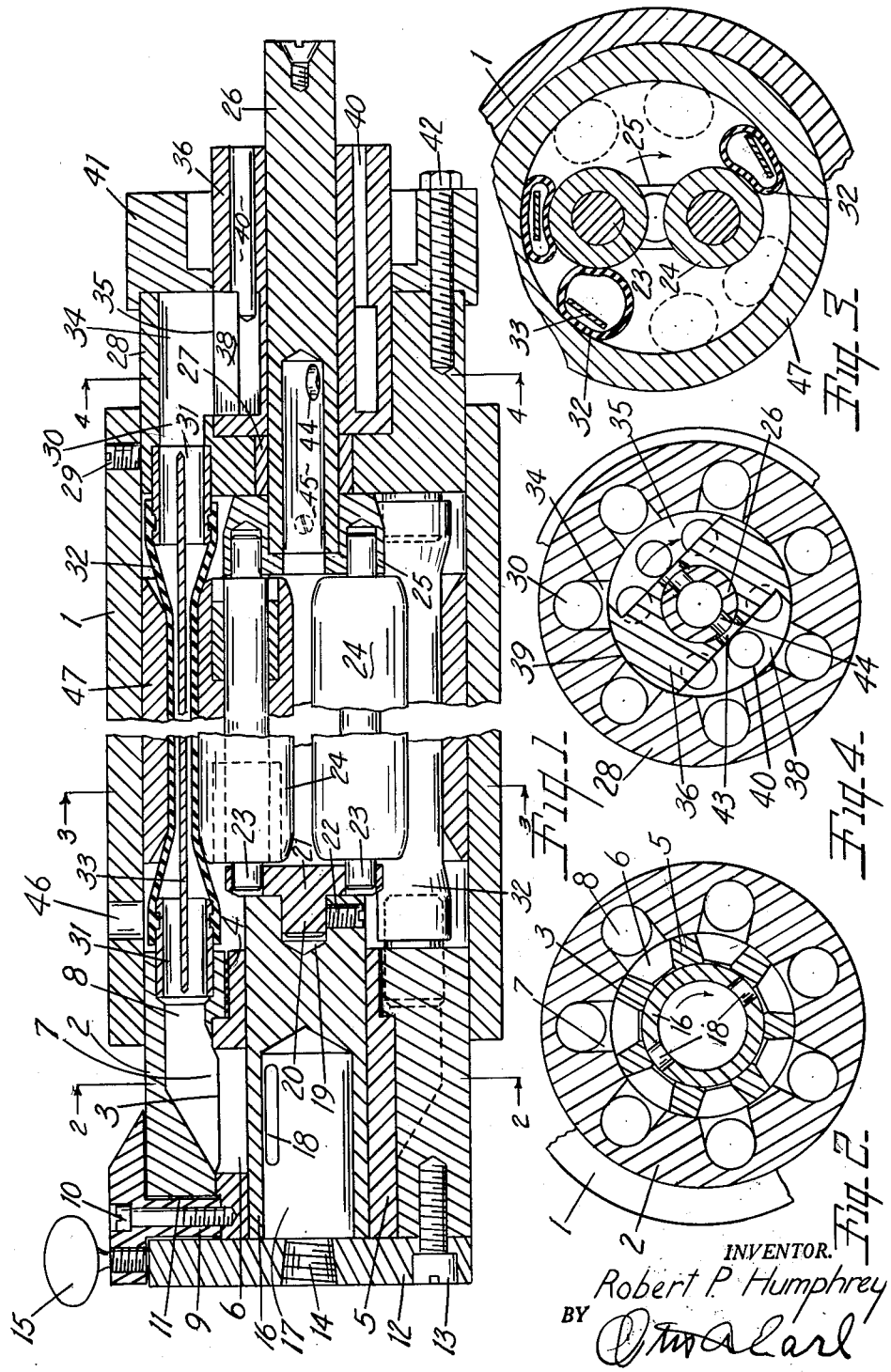

3,019,772
FLUID MOTOR WITH FLEXIBLE TUBULAR CYLINDERS SYMMETRICALLY SPACED ABOUT THE POWER SHAFT
Robert P. Humphrey, Kalamazoo, Mich., assignor to General Gas Light Company, Kalamazoo, Mich.
Continuation of application Ser. No. 809,117, Apr. 27, 1959. This application Feb. 8, 1960, Ser. No. 7,485
20 Claims. (Cl. 121—48)

This application relates to improvements in energy transducing devices. It is a continuation of application Serial No. 809,117, filed April 27, 1959 for fluid pressure operated motors, now abandoned. The principal objects of this invention are:

First, to provide an energy transducing device in which energy is transduced in either direction between energy in the form of pressure in a fluid and rotary mechanical energy in a shaft by means of walls forming an expansible chamber with a movable wall of the chamber positioned adjacent to a shaft to move transversely with respect to the shaft upon expansion and contraction of the chamber and an eccentric on the shaft engaged with the movable wall to relate motion of the wall to rotation of the shaft and transmit force therebetween, there being valve mechanism driven in timed relation to the shaft and the movable wall to regulate the flow of fluid to and from the expansible chamber.

Second, to provide a novel form of fluid pressure operated motor in which the fluid driving medium functions in expansible flexible chambers to act against the driven parts of the motor without direct contact therewith.

Third, to provide a fluid pressure transducing device of the positive displacement type as distinguished from velocity turbines in which it is not necessary to maintain close fluid pressure retaining seals between the driving and stationary parts of the motor.

Fourth, to provide a fluid pressure operated motor which can readily be manufactured in a variety of power capacities with a minimum of change in its parts.

Fifth to provide a novel fluid pressure operated motor which is inexpensive to manufacture yet highly efficient in operation.

Sixth, to provide a novel form of transducing device in which drive elements mounted for rotation in eccentric relation about a central shaft pass successively in radially deflecting contact with a series of fluid displacing elements mounted in angularly spaced relation around the shaft to transduce energy between fluid pressure on the fluid displacing elements and rotary energy in the shaft.

Other objects and advantages of the invention will be apparent from a consideration of the following description and claims.

The drawings, of which there are two sheets, illustrate a highly practical form of the motor along with modified forms of two details or parts thereof.

FIG. 1 is a fragmentary longitudinal cross sectional view through the assembled motor.

FIG. 2 is a fragmentary transverse cross sectional view taken along the plane of the line 2—2 in FIG. 1 through the pressure inlet valve and system of the motor.

FIG. 3 is a fragmentary transverse cross sectional view taken along the plane of the line 3—3 in FIG. 1 through the driving or power conversion portion of the motor.

FIG. 4 is a fragmentary transverse cross sectional view taken along the plane of the line 4—4 in FIG. 1 through the outlet valve and control mechanism of the motor.

FIG. 5 is a fragmentary elevational view of a subassembly of the drive shaft, drive member and outlet valve shown in FIGS. 1 and 4.

FIG. 6 is a transverse cross sectional view taken along the plane of the line 6—6 in FIG. 5.

FIG. 7 is a perspective view of a modified form of the drive member or roll carrier shown in FIGS. 1 and 3.

FIG. 8 is a fragmentary transverse cross sectional view taken along the plane of the line 8—8 in FIG. 7.

FIG. 9 is a transverse cross sectional view through a modified form of flexible fluid retaining element for use in the motor.

The motor of the invention is designed primarily as an air motor for operation by compressed air from any suitable source but, as will be appreciated, the motor can be operated by a wide variety of fluid pressure media.

The motor consists of an outer tubular cylindrical body 1 having a cylindrical inlet block 2 fitted in one end thereof. The inlet block 2 defines a central inlet chamber 3 with a bearing bore 4 in the inner end thereof. Angularly adjustably fitted within the chamber 3 is a cylindrical adjusting valve 5 having a series of radially opening ports or slots 6 formed therethrough. The ports 6 register with an equal number of inlet ports 7 formed in radially opening position around the interior of the inlet block 2 and also opening axially through the inlet ports 8 to the interior of the tubular body 1. An adjusting finger 9 secured to the cylinder 5 by the screw 10 extends through a radial notch 11 provided therefor in the inlet block 2 to the periphery of the block for selective angular adjustment of the cylinder 5 to vary the degree of opening between the ports 6 and 7. Adjustment of the adjusting valve 5 also advances and retards the effective positions of the inlet ports 6 and 7 angularly around the inlet block 2. As will be pointed out this affects the operation of the motor. An end plate 12 secured to the end of the block 2 as by cap screws 13, retains adjusting valve 5 within the inlet block and also defines a central inlet passage and connection 14 for admitting fluid under pressure to the motor. The thumb screw 15 holds the adjusting finger 9 in the desired adjusted position.

Positioned rotatably and sealingly within the adjusting valve 5 is a cylindrical automatic distribution inlet valve 16 having a central cavity 17 opening to the inlet connection 14. Two diametrically opposed inlet slots or ports 18 formed in the inlet valve register successively with the inlet ports 6 as the valve 16 is rotated as will be described. The inner end of the inlet valve 16 projects through the adjusting valve 5 and the inlet block 2 and is provided with a socket 19 receiving the central stud 20 of a first roll carrier 21. The carrier is nonrotatably and drivingly connected to the inlet valve 16 as by the set screw 22. The carrier 21 has eccentrically positioned holes receiving and supporting the ends of roll support shafts 23. The shafts 23 each freely rotatably support a drive roll 24 and function to swing the rolls in an orbit about the axis of the body 1 as the motor is driven. The rolls 24 constitute force transmitting members which in the example illustrated drive the shaft 26 as will be described.

The other ends of the roll support shafts 23 are carried and supported by a second carrier member 25 which is in turn supported and relatively drivingly connected on the end of a drive shaft 26. The shaft 26 is rotatably supported in a central bearing 27 carried by an outlet block 28 secured in the opposite end of the body 1 from the inlet block by a set screw 29. The outlet block 28 defines an annularly arranged series of outlet ports 30 arranged in opposed relation to the inlet ports 8 in the inlet block. Each pair of inlet and outlet ports receives a pair of supporting and connecting nipples 31 which project into the tubular body 1 and support the ends of a flexible and expansible walled tube 32 made of rubber or some similar expansible material. Flat support plates 33 projecting through the tubes and supported by the nipples 31 prevent angular displacement of the center portions of the tubes while permitting free expansion and contraction of the tubes. With particular reference to FIGS. 1 and 3 it will be seen that the rollers 24 will successively collapse the tubes 32 such as the upper tube illustrated and that fluid pressure admitted to the tubes in properly timed relation will expand the tubes such as the lower and left side tubes shown in full lines in FIG. 3 to exert rotating pressure against the rollers 24 to rotate the rollers and the carriers 21 and 25 and drive the drive shaft 26.

The outlet ends of the tubes 32 and the outlet ports 30 open through a series of radially inwardly opening ports 34 in the outlet block 28 to the outlet chamber 35 in which is rotatably mounted the outlet valve 36. The outlet valve 36 is supported around and connected to the drive shaft 26 as by the set screw 37 (see FIGS. 5 and 6) and has a pair of oppositely positioned outlet recesses 38 formed in its surface. The recesses are separated by segmental shut-off surfaces 39 which function to successively cut off the outlet like ports 34. The outlet recesses 38 open continuously through exhaust passages 40 to the outer end of the outlet valve. An end cap 41 secured to the outlet block by the cap screws 42 closes the ends of the outlet ports 30 in the outlet block. The outlet passages 38 also open radially inwardly through ports 43 to holes 44 in the shaft 26. The holes 44 communicate with a bore 45 in the drive shaft so that a part of the exhaust air or fluid is circulated through the interior of the motor and around the tubes 32 and rollers 24 to cool the motor parts. This cooling air is exhausted through the exhaust port 46 near the upper left end of the body in FIG. 1.

As is best illustrated in FIGS. 2 and 4 the inlet valve 16 and its ports 18 are angularly disposed relative to the outlet valve 36 and its outlet passages 38 so that air will always be supplied to at least one of the tubes 32 and except when the ports 18 are traversing the short distance between the slots 6 will be delivered to tubes on opposite sides of the body to maintain a continuous drive pressure on the rolls 24 and the drive shaft. The outlet valve 36 opens the outlet ends of the tubes as soon as the rolls advance beyond the tubes and leaves the tubes open for easy compression until the rollers pass beyond the center of each successive tube. This type of motor will operate at high speed or low speed depending upon the adjustment of the adjusting valve 5 and can be easily manufactured in a variety of power capacities simply by extending the length of the body 1, the tubes 32 and the rolls 24. An inner insert 47 within the cylindrical body 1 supports the outer sides of the tubes as desired. Angular advance of the adjusting valve 5 in a clockwise direction as viewed in FIG. 2 will retard the time at which air will be supplied to the tubes and reverse adjustment of the valve 5 advance the time. This permits optimum setting for various speeds and loads.

The modified elements of the motor shown in FIGS. 7 to 9 can be incorporated or substituted into the motor just described. FIGS. 7 and 8 illustrate a modified form of drive roll mounting in which a block-like single carrier 48 is provided with flatted end studs 49 for connection to the inlet and outlet valve of the motor and is provided with oval shaped recesses 50 in its sides which rotatably receive and support the cigar shaped rolls 51 in the same operative position relative to the expansion tubes 32 as the first form of the motor described. Desirably, the recesses 50 have an anti-friction coating indicated in exaggerated form at 52 and the ends of the rollers are somewhat enlarged as at 53 so that actual bearing force on the roller and the carrier block 48 occurs at the ends of the rollers.

FIG. 9 shows a possible modified form of extruded expansion tubes 54 in which a series of the tubes are connected by integral annular wall segments 55, the whole assembly being extruded from a single die and cut to the desired length. The tube assembly of this type would eliminate the need for the bars 33 in the first form of the invention. Various other changes can be incorporated into the motor without departing from the basic concept which involves the rotation of the drive rolls successively over the series of tubes and the delivery of fluid pressure to the tubes to expand them in driving relation against the rolls as they pass.

A number of variations of the disclosed form of the motor can be made without departing from the concept of the invention as defined in the claims. In effect the carriers 21 and 25 and connecting roll shafts 23 constitute a rotor mounted coaxially with respect to the body 1. The one or more rollers 24 are rotated in intersecting relation to the radially advanced positions of the tubes 32 which constitute drive members that are extensible or projectable radially from the body under fluid pressure to drive the rotor. The drive members can project or advance radially inwardly as shown or can advance radially outwardly from a central body by mounting the rollers in more widely spaced positions on the rotor to rotate around the outside of the body. Further, the drive members need not be expansible tubes but can be rigid elements radially movably guided in suitable slots or guides in the body with the fluid pressure delivery means connected to deliver to the slots to advance to drive members.

The several tubes 32 and 54 in both forms of the structure constitute fluid displacing elements which are collapsed or deflected in fluid displacing action by rotation of the rollers 24 or 51 eccentrically around the axis of shafts 26 or 49.

What is claimed as new is:

1. A fluid pressure driven motor comprising a tubular body, an inlet block mounted in one end of said body and defining a central inlet valve chamber opening axially through the body with a series of angularly spaced inlet ports opening radially to the valve chamber and axially to the inner end of the inlet block, an outlet block mounted in the other end of said tubular body and defining a central exhaust valve chamber with a series of angularly spaced outlet ports opening radially thereto and axially to the inner end of said outlet block, a speed adjusting valve of cylindrical shape mounted within said inlet chamber and having radially opening ports selectively movable into registry with said inlet ports in said inlet block, an adjusting member connected to said adjusting valve and projecting exteriorly of said inlet block, a cylindrical inlet valve rotatably mounted within said adjusting valve and having diametrically opposed ports rotatable across the inner ends of the slots in said adjusting valve, an end plate secured to said inlet block over the outer ends of said adjusting valve and said inlet valve and having a connection for a fluid pressure delivery conduit opening to the interior of said inlet valve, an opening in said outlet block extending between the bottom of said exhaust valve chamber and the inner face of said outlet block, an outlet valve having a cylindrical contour positioned in said outlet valve chamber and having an axial central shaft passage aligned with said opening in said outlet block, outlet passages formed as diametrically opposed recesses in the surface of said outlet valve and extending angularly therearound to simultaneously register with a plurality of outlet ports in said outlet block with outlet port closing area on the surface of the outlet valve member between said outlet passages, exhaust passages extending axially through said outlet valve from said outlet passages to the outer end of the outlet valve, a driven passage extending axially through said outlet valve and the opening in said outlet block and rotatably supported by a bearing in said opening in said outlet block, means non-rotatably connecting said outlet valve to said shaft, a first roll carrier non-rotatably and drivingly connected to said shaft at the inner end of said outlet block, a second roll carrier non-rotatably and drivingly connected to said inlet valve at the inner end of said inlet valve, roll shafts extending axially through said tubular body and connected at their ends to said roll carriers eccentrically with respect to said shaft and said body, roll members rotatably mounted on said roll shafts with their peripheries in inwardly spaced relation from the inside of the said tubular body, a series of flexible and expansible walled tubes disposed in angularly spaced relation around the interior of said tubular body with their opposite ends connected to said inlet and outlet ports by means of nipples fitted axially in the ports and ends of the tubes, flat tube supporting plates extending through said tubes and disposed in chordal relation around the interior of said tubular body, an annular tube backing member positioned around the interior of said tubular body and supporting the outer sides of said tubes in spaced relation to the cylinder generated by rotation of said rolls rotating with said carriers whereby each roll substantially collapses each tube in passing thereover, said inlet ports in said inlet valve and said outlet passages in said outlet valve being relatively angularly disposed with respect to said body to successively admit fluid pressure to said inlet ports and said tubes and to close off the outlet ends of the tubes when pressure is applied thereto, said inlet ports in said inlet valve having angular overlapping relation with the passages in said adjusting valve to simultaneously admit fluid pressure to two tubes on opposite sides of said tubular body, said outlet valve and driven shaft having registering pasages formed therein opening through said first carrier to the interior of said tubular body and said tubular body having an outlet formed therethrough whereby part of the exhausted fluid from said tubes is circulated through said body to cool said tubes and rolls.

2. A fluid pressure driven motor comprising a tubular body, an inlet block mounted in one end of said body and defining a central inlet valve chamber opening axially through the body with a series of angularly spaced inlet ports opening radially to the valve chamber and axially to the inner end of the inlet block, an outlet block mounted in the other end of said tubular body and defining a central exhaust valve chamber with a series of angularly spaced outlet ports opening radially thereto and axially to the inner end of said outlet block, a speed adjusting valve of cylindrical shape mounted within said inlet chamber and having radially opening ports selectively movable into registry with said inlet ports in said inlet block, an adjusting member connected to said adjusting valve and projecting exteriorly of said inlet block, a cylindrical inlet valve rotatably mounted within said adjusting valve and having diametrically opposed ports rotatable across the inner ends of the slots in said adjusting valve, means closing the outer ends of said adjusting valve and said inlet valve and having a connection for a fluid pressure delivery conduit opening to the interior of said inlet valve, and opening in said outlet block extending between the bottom of said exhaust valve chamber and the inner face of said outlet block, an outlet valve having a cylindrical contour positioned in said outlet valve chamber and having an axial central shaft passage aligned with said opening in said outlet block, outlet passages formed as diametrically opposed recesses in the surface of said outlet valve and extending angularly therearound to simultaneously register with a plurality of outlet ports in said outlet block with outlet port closing area on the surface of the outlet valve member between said outlet passages, exhaust passages extending axially through said outlet valve from said outlet passages to the outer end of the outlet valve, a driven shaft extending axially through said outlet valve and the opening in said outlet block and rotatably supported in said outlet block, means non-rotatably connecting said outlet valve to said shaft, a first roll carrier non-rotatably and drivingly connected to said outlet block, a second roll carrier non-rotatably and drivingly connected to said inlet valve at the inner end of said inlet valve, roll shafts extending axially through said tubular body and connected at their ends to said roll carriers eccentrically with respect to said shaft and said body, roll members rotatably mounted on said roll shafts with their peripheries in inwardly spaced relation from the inside of the said tubular body, a series of expansible walled tubes disposed in angularly spaced relation around the interior of said tubular body with their opposite ends connected to said inlet and outlet ports, an annular tube backing member positioned around the interior of said tubular body and supporting the outer sides of said tubes in spaced relation to the cylinder generated by rotation of said rolls rotating with said carriers whereby each roll substantially collapses each tube in passing thereover, said inlet ports in said inlet valve and said outlet passages in said outlet valve being relatively angularly disposed with respect to said body to successively admit fluid pressure to said inlet ports and said tubes and to close off the outlet ends of the tubes when pressure is applied thereto, said inlet ports in said inlet valve having angular overlapping relation with the passages in said adjusting valve to simultaneously admit fluid pressure to two tubes on opposite sides of said tubular body.

3. A fluid pressure driven motor comprising a tubular body, an inlet block mounted in one end of said body and defining a central inlet valve chamber opening axially through the body with a series of angularly spaced inlet ports opening radially to the valve chamber and axially to the inner end of the inlet block, an outlet block mounted in the other end of said tubular body and defining a central exhaust valve chamber with a series of angularly spaced outlet ports opening radially thereto and axially to the inner end of said outlet block, a cylindrical inlet valve rotatably mounted within said inlet valve chamber and having diametrically opposed ports rotatable across the inner ends of the slots in said inlet block, means closing the outer end of said inlet valve chamber and having a connection for a fluid pressure delivery conduit opening to the interior of said inlet valve, an opening in said outlet block extending between said exhaust valve chamber and the inner face of said outlet block, an outlet valve having a cylindrical contour and rotatably positioned in said outlet valve chamber and having an axial central shaft passage aligned with said opening in said outlet block, outlet passages formed as diametrically opposed recesses in the surface of said outlet valve and extending angularly therearound to simultaneously register with a plurality of outlet ports in said outlet block with outlet port closing area on the surface of the outlet valve member between said outlet passages, exhaust passages extending axially through said outlet valve from said outlet passages to the outer end of the outlet valve, a driven shaft extending axially through said outlet valve and the opening in said outlet block and rotatably supported by a bearing in said opening in said outlet block, means non-rotatably connecting said outlet valve to said shaft, a first roll carrier non-rotatably and drivingly connected to said shaft at the inner end of said outlet block, a second roll carrier non-rotatably and drivingly connected to said inlet valve at the inner end of said inlet valve, roll shafts extending axially through said tubular body and connected at their ends to said roll carriers eccentrically with respect to said shaft and said body, roll members rotatable about the axes of said roll shafts with their peripheries in inwardly spaced relation from the inside of the said tubular body, and a series of expansible walled tubes disposed in angularly spaced relation around the interior of said tubular body with their opposite ends connected to said inlet and outlet ports, said tubular body supporting the outer sides of said tubes in spaced relation to the cylindrical surface generated by rotation of said rolls rotating with said carriers whereby each roll collapses each tube in passing thereover, said inlet ports in said inlet valve and said outlet passages in said outlet valve being relatively angularly disposed with respect to said body to successively admit fluid pressure to said inlet ports and said tubes and to close off the outlet ends of the tubes when pressure is applied thereto, said inlet ports in said inlet valve having angular overlapping relation with the inlet ports in said inlet block to simultaneously admit fluid pressure to two tubes on opposite sides of said tubular body.

4. A fluid pressure driven motor comprising a tubular body, an inlet block mounted in one end of said body and defining a central inlet valve chamber opening axially through the body with a series of angularly spaced inlet ports opening radially to the valve chamber and axially to the inner end of the inlet block, an outlet block mounted in the other end of said tubular body and defining a central exhaust valve chamber with a series of angularly spaced outlet ports opening radially thereto and axially to the inner end of said outlet block, a cylindrical inlet valve rotatably mounted within said inlet valve chamber and having diametrically opposed ports rotatable across the inner ends of the slots in said inlet block, means closing the outer end of said inlet valve chamber and having a connection for a fluid pressure delivery conduit opening to the interior of said inlet valve, an opening in said outlet block extending between said exhaust valve chamber and the inner face of said outlet block, an outlet valve having a cylindrical contour and rotatably positioned in said outlet valve chamber and having an axial central shaft passage aligned with said opening in said outlet block, outlet passages formed as opposed recesses in the surface of said outlet valve and extending angularly therearound to simultaneously register with a plurality of outlet ports in said outlet block with outlet port closing areas on the surface of the outlet valve member between said outlet passages, exhaust passages extending from said outlet passages to the outer end of the outlet valve, a driven shaft extending axially in said outlet block and rotatably supported in said outlet block, means non-rotatably connecting said outlet valve to said shaft, a first roll carrier non-rotatably and drivingly connected to said outlet block, a second roll carrier non-rotatably and drivingly connected to said inlet valve, roll shafts extending axially through said tubular body and connected at their ends to said roll carriers eccentrically with respect to said shaft and said body, roll members rotatable about the axes of said roll shafts with their peripheries in inwardly spaced relation from the inside of the said tubular body, and a series of expansible walled tubes disposed in angularly spaced relation around the interior of said tubular body with their opposite ends connected to said inlet and outlet ports, said tubular body supporting the outer sides of said tubes in spaced relation to the cylindrical surface generated by rotation of said rolls rotating with said carriers whereby each roll collapses each tube in passing thereover, said inlet ports in said inlet valve and said outlet passages in said outlet valve being relatively angularly disposed with respect to said body to successively admit fluid pressure to said inlet ports and said tubes and to close off the outlet ends of the tubes when pressure is applied thereto.

5. A fluid pressure driven motor comprising a tubular body, an inlet block mounted in one end of said body and defining a central inlet valve chamber opening axially through the body with a series of angularly spaced inlet ports opening radially to the valve chamber and axially to the inner end of the inlet block, an outlet block mounted in the other end of said tubular body and defining a central exhaust valve chamber with a series of angularly spaced outlet ports opening radially thereto and axially to the inner end of said outlet block, a speed adjusting valve of cylindrical shape mounted within said inlet chamber and having radially opening ports selectively movable into registry with said ports in said inlet block, an adjusting member connected to said adjusting valve and projecting exteriorly of said inlet block, a cylindrical inlet valve rotatably mounted within said adjusting valve and having diametrically opposed ports rotatable across the inner sides of the slots in said adjusting valve, means closing the outer ends of said adjusting valve and said inlet valve and having a connection for a fluid pressure delivery conduit opening to the interior of said inlet valve, an opening in said outlet block extending between the bottom of said exhaust valve chamber and the inner face of said outlet block, an outlet valve having a cylindrical contour positioned in said outlet valve chamber and having an axial central shaft passage aligned with said opening in said outlet block, outlet passages formed as opposed recesses in the surface of said outlet valve and extending angularly therearound to simultaneously register with a plurality of outlet ports in said outlet block with outlet port closing areas on the surface of the outlet valve member between said outlet passages, means forming exhaust passages from said outlet passages to the exterior of the outlet valve, a driven shaft extending axially from said outlet valve and rotatably supported in said outlet block, means non-rotatably connecting said outlet valve to said shaft, a first roll carrier non-rotatably and drivingly connected to said inlet valve at the inner end of said inlet valve, roll shafts extending axially through said tubular body and connected at their ends to said roll carriers eccentrically with respect to said shaft and said body, roll members rotatable about the axis of said roll shafts with their peripheries in inwardly spaced relation from the inside of the said tubular body, and a series of flexible and expansible walled tubes disposed in angularly spaced relation around the interior of said tubular body with their opposite ends connected to said inlet and outlet ports, said tubular body supporting the outer side of said tubes in spaced relation to the cylindrical surface generated by rotation of said rolls rotating with said carriers whereby each roll collapses each tube in passing thereover, said inlet ports in said inlet valve and said outlet ports in said outlet valve being relatively angularly disposed with respect to said body to successively admit fluid pressure to said inlet ports and said tubes and to close off the outlet ends of the tubes when pressure is applied thereto, said inlet ports in said inlet valve having angular overlapping relation with the passages in said adjusting valve to simultaneously admit fluid pressure to two tubes on opposite sides of said tubular body.

6. A fluid pressure driven motor comprising a tubular body, an inlet block mounted in one end of said body and defining a central inlet valve chamber opening axially through the body with a series of angularly spaced inlet ports opening radially to the valve chamber and axially to the inner end of the inlet block, an outlet block mounted in the other end of said tubular body and defining a central exhaust valve chamber with a series of angularly spaced outlet ports opening radially thereto and axially to the inner end of said outlet block, a speed adjusting valve of cylindrical shape mounted within said inlet chamber and having radially opening ports selectively movable into registry with said ports in said inlet block, an adjusting member connected to said adjusting valve and projecting exteriorly of said inlet block, a cylindrical inlet valve rotatably mounted within said adjusting valve and having diametrically opposed ports rotatable across the inner ends of the slots in said adjusting valve, means closing the outer ends of said adjusting valve and said inlet valve and having a connection for a fluid pressure delivery conduit opening to the interior of said inlet valve, an outlet valve having a cylindrical contour positioned in said outlet valve chamber and aligned with said opening in said outlet block, outlet passages formed as opposed recesses in the surface of said outlet valve to simultaneously register with a plurality of outlet ports in said outlet block with outlet port closing areas on the surface of the outlet valve member between said outlet passages, means forming exhaust passages from said outlet passages to the exterior of the outlet valve, a driven shaft extending axially from said outlet valve and rotatably supported in said outlet block, means non-rotatably connecting said outlet valve to said shaft, roll shafts extending axially through said tubular body and connected at their ends to said valves eccentrically with respect to said shaft and said body, roll members rotatable about the axes of said roll shafts with their peripheries in inwardly spaced relation from the inside of the said tubular body, and a series of flexible and expansible walled tubes disposed in angularly spaced relation around the interior of said tubular body with their opposite ends connected to said inlet and outlet ports, said tubular body supporting the outer side of said tubes in spaced relation to the cylindrical surface generated by rotation of said rolls rotating with said valves whereby each roll collapses each tube in passing thereover, said inlet ports in said inlet valve and said outlet ports in said outlet valve being relatively angularly disposed with respect to said body to successively admit fluid pressure to said inlet ports and said tubes and to close off the outlet ends of the tubes when pressure is applied thereto, said inlet ports in said inlet valve having angular overlapping relation with the passages in said adjusting valve to simultaneously admit fluid pressure to two tubes on opposite sides of said tubular body.

7. A fluid pressure driven motor comprising a tubular body, an inlet block mounted in one end of said body and defining a central inlet valve chamber opening axially through the body with a series of angularly spaced inlet ports opening radially to the valve chamber and axially to the inner end of the inlet block, an outlet block mounted in the other end of said tubular body and defining a central exhaust valve chamber with a series of angularly spaced outlet ports opening radially thereto and axially to the inner end of said outlet body member, a speed adjusting valve of cylindrical shape mounted within said inlet chamber and having radially opening slots selectively movable into registry with said ports in said inlet block, an adjusting member connected to said adjusting valve and projecting exteriorly of said inlet block, a cylindrical inlet valve rotatably mounted within said adjusting valve and having a port rotatable across the inner ends of the slots in said adjusting valve, means closing the outer ends of said adjusting valve and said inlet valve and having a connection for a fluid pressure delivery conduit opening to the interior of said inlet valve, an opening in said outlet block extending between the outlet valve chamber and the inner face of said outlet block, an outlet valve having a cylindrical contour positioned in said outlet valve chamber, an outlet passage formed as a recess in the surface of said outlet valve and extending angularly therearound to successively register with said outlet ports in said outlet block, means forming an exhaust passage extending from said outlet passage to the exterior of the outlet valve, a driven shaft supported by said outlet block, means non-rotatably connecting said outlet valve to said shaft, roll shafts extending axially through said tubular body and connected at their ends to said valves eccentrically with respect to said shaft and said body, roll members rotatably about the axes of said roll shafts with their peripheries in inwardly spaced relation from the inside of the said tubular body, and a series of flexible and expansible walled tubes disposed in angularly spaced relation around the interior of said tubular body with their opposite ends connected to said inlet and outlet ports, said inlet valve and said outlet passage in said outlet valve being relatively angularly disposed with respect to said body to successively admit fluid pressure to said inlet ports and said tubes and to close off the outlet ends of the tubes when pressure is applied thereto.

8. A fluid pressure motor comprising a tubular body with valve blocks in each end, a series of tubes with radially flexible walls disposed around the interior of said body with their ends connected to said blocks, a shaft to be driven rotatably supported within one of said blocks and extending into said body, a carrier non-rotatably and drivingly connected to said shaft within said body, a plurality of rolls supported on axially extending axes eccentric to said shaft and drivingly connected to said carrier to swing in an arc in collapsing relation over said tubes, and inlet and outlet valves in said blocks drivingly connected to said carrier and said rolls to successively admit fluid pressure to said tubes as said rolls pass thereover to expand the tubes and advance the rolls and said carrier, said tubes being angularly disposed around said rolls so that one tube is always positioned in expandible drivable relation to one of said rolls.

9. A fluid pressure motor comprising a tubular body with valve blocks in each end, a series of tubes with radially flexible walls disposed around the interior of said body with their ends connected to said blocks, a shaft to be driven rotatably supported within one of said blocks and extending into said body, a carrier non-rotatably and drivingly connected to said shaft within said body, a plurality of rolls supported on axially extending axes eccentric to said shaft and drivingly connected to said carrier to swing in an arc in collapsing relation over said tubes, and inlet and outlet valves in said blocks drivingly connected to said carrier and said rolls to successively admit fluid pressure to said tubes as said rolls pass thereover to expand the tubes and advance the rolls and said carrier.

10. A fluid pressure motor comprising a tubular body with valve blocks mounted in each end, a series of tubes with radially flexible walls disposed around the interior of said body with their ends connected to said blocks, said blocks defining inlet and outlet ports communicating with said tubes, a shaft to be driven rotatably supported within one of said blocks, a plurality of rolls supported on axially extending axes eccentric to said shaft and drivingly connected to said shaft to swing in an arc in collapsing relation over said tubes, inlet and outlet valves in said blocks drivingly connected to said rolls to successively admit fluid pressure to said tubes as said rolls pass thereover to expand the tubes and advance the rolls.

11. A fluid pressure motor comprising a tubular body with valve blocks mounted in each end, a series of tubes with radially flexible walls disposed around the interior of said body with their ends connected to said blocks, said blocks defining inlet and outlet ports communicating with said tubes, a shaft to be driven rotatably supported within one of said blocks, a roll supported on an axially extending axis eccentric to said shaft and drivingly connected to said shaft to swing in an arc in collapsing relation over said tubes, inlet and outlet valves in said blocks drivingly connected to said roll to successively admit fluid pressure to said tubes as said roll passes thereover to expand the tubes and advance the roll.

12. A fluid pressure motor comprising a tubular body with blocks in each end, a series of tubes with radially flexible walls disposed around the interior of said body with their ends connected to said blocks, a shaft to be driven rotatably supported within one of said blocks and extending into said body, a carrier non-rotatably and drivingly connected to said shaft within said body, a plurality of rolls supported on axially extending axes eccentric to said shaft and drivingly connected to said carrier to swing in an arc in collapsing relation over said tubes, and an inlet valve in one of said blocks drivingly connected to said carrier and said rolls to successively admit fluid pressure to said tubes as said rolls pass thereover to expand the tubes and advance the rolls and said carrier, said tubes being angularly disposed around said rolls so that one tube is always positioned in expandible drivable relation to one of said rolls.

13. A fluid pressure motor comprising a tubular body with blocks in each end, a series of tubes with radially flexible walls disposed around the interior of said body with their ends connected to said blocks, a shaft to be driven rotatably supported within one of said blocks and extending into said body, a carrier non-rotatably and drivingly connected to said shaft within said body, a plurality of rolls supported on axially extending axes eccentric to said shaft and drivingly connected to said carrier to swing in an arc in collapsing relation over said tubes, and an inlet valve in one of said blocks drivingly connected to said carrier and said rolls to successively admit fluid pressure to said tubes as said rolls pass thereover to expand the tubes and advance the rolls and said carrier.

14. In a fluid pressure motor, a tubular body, a series of expansible walled tubes arranged as elements of an annulus around the inside of said tube and supported on their outer sides by said tubular body, a plurality of rollers positioned eccentrically within said body, means rotatably supporting said rollers for movement in rotating collapsing relation over said tubes, a shaft connected to said roller supporting means to be driven thereby, and valve means including a plurality of fixed ports communicating with said tubes and a rotatable valve element driven by said roller supporting means and arranged to successively admit fluid pressure to said tubes as each of said rollers passes its extreme collapsing relation to each tube, said tubes and said rollers being angularly arranged around the axis of said body so that one tube is always in partially expanded driving relation to one of said rollers when another roller is in extreme collapsing relation to another of said tubes, and a manually adjustable valve element angularly movable relative to said valve means to advance and retard the opening of said valve means relative to its rotated position with said shaft.

15. In a fluid pressure motor, a tubular body, a series of expansible walled tubes arranged as elements of an annulus around the inside of said tube and supported on their outer sides by said tubular body, a plurality of rollers positioned eccentrically within said body, means rotatably supporting said rollers for movement in rotating collapsing relation over said tubes, a shaft connected to said roller supporting means to be driven thereby, and valve means including a plurality of fixed ports communicating with said tubes and a rotatable valve element driven by said roller supporting means and arranged to successively admit fluid pressure to said tubes as each of said rollers passes its extreme collapsing relation to each tube, and a manually adjustable valve element angularly movable relative to said valve means to advance and retard the opening of said valve means relative to its rotated position with said shaft.

16. A fluid pressure motor comprising a cylindrical reaction body, a plurality of elongated drive members arranged longitudinally in angularly spaced relation along elements of said body and supported thereagainst, fluid pressure delivery means connected to advance said drive members radially inwardly of a retracted position relative to said body, a rotor to be driven and arranged generally coaxially with said body, a plurality of rollers carried eccentrically by said rotor and rotatable thereby in intersecting relation laterally across the advanced positions of said drive members, valve means rotatively driven by said rotor and connected to control said delivery means to admit fluid pressure successively to said drive members as said rollers pass maximum retracting relation with respect to said drive members whereby said drive members advance radially inwardly from said body and cammingly drive said rollers and said rotor in rotary motion, and a driven part connected to said rotor.

17. A fluid pressure motor comprising a cylindrical reaction body, a plurality of elongated drive members arranged longitudinally in angularly spaced relation along elements of said body, fluid pressure delivery means connected to advance said drive members radially of a retracted position relative to said body, a rotor to be driven arranged generally coaxially with said body, a roller carried eccentrically by said rotor and rotatable thereby in intersecting relation laterally across the advanced positions of said drive members, valve means driven by said rotor and connected to control said delivery means to admit fluid pressure successively to said drive members as said roller passes retracting relation with respect to said drive members whereby said drive members advance radially from said body and cammingly drive said roller and said rotor in rotary motion, and a driven part connected to said rotor.

18. A device for transducing energy between pressure in a fluid and rotating energy in a shaft comprising a shaft mounted for rotation about an axis, a force transmitting member mounted for orbital motion about the axis of said shaft and for rotation about its own axis parallel to the axis of said shaft, said member being elongated substantially along its axis relative to its transverse dimension, a plurality of hollow and flexible fluid displacing elements generally coextensive in length with said force transmitting member and arranged circumferentially around said shaft in the path of said transmitting member to be successively engaged and deflected by said transmitting member, means for retaining fluid pressure against said displacing elements in opposition to the force exerted on the elements by said transmitting member, and valve means actuated by rotation of said shaft connected to control the admission to and escape of fluid from contact with said displacing elements in timed relation to passage of said force transmitting member over said displacing elements.

19. A device for transducing energy between pressure in a fluid and rotating energy in a shaft comprising a shaft mounted for rotation about an axis, a force transmitting member mounted for orbital motion about the axis of said shaft and for rotation about its own axis, a plurality of fluid displacing elements arranged circumferentially around said shaft in the path of said transmitting member to be successively engaged and deflected by said transmitting member, means for retaining fluid pressure against said displacing elements in opposition to the force exerted on the elements by said transmitting member, and valve means actuated by rotation of said shaft connected to control the admission to and escape of fluid from contact with said displacing elements in timed relation to passage of said force transmitting member over said displacing elements, said force transmitting member and said fluid displacing elements being elongated substantially parallel to said axis relative to their transverse dimensions.

20. A device for transducing energy between pressure in a fluid and rotating energy in a shaft comprising a shaft mounted for rotation about an axis, a force transmitting member mounted for orbital motion about the axis of said shaft, a plurality of fluid displacing elements arranged circumferentially around said shaft in the path of said transmitting member to be successively engaged and deflected by said transmitting member, means for retaining fluid pressure against said displacing elements in opposition to the force exerted on the elements by said transmitting member, and valve means actuated by rotation of said shaft connected to control the admission to and escape of fluid from contact with said displacing elements in timed relation to passage of said force transmitting member over said displacing elements, said force transmitting member and said fluid displacing elements being elongated substantially parallel to said axis relative to their transverse dimensions.

References Cited in the file of this patent

UNITED STATES PATENTS

| | | |
|---|---|---|
| 40,195 | Smith | Oct. 6, 1863 |
| 125,442 | Darker | Apr. 9, 1872 |
| 1,488,528 | Cardini | Apr. 1, 1924 |
| 2,629,333 | Olden | Feb. 24, 1953 |
| 2,815,006 | Hahn | Dec. 3, 1957 |

FOREIGN PATENTS

| | | |
|---|---|---|
| 10,294 | Great Britain | July 3, 1890 |
| 272,411 | Great Britain | June 17, 1927 |
| 994,857 | France | Aug. 14, 1951 |